United States Patent [19]

Matsuda et al.

[11] Patent Number: 4,874,089
[45] Date of Patent: Oct. 17, 1989

[54] LIGHT-TIGHT CASSETTE

[75] Inventors: Tsukasa Matsuda; Kazuo Ui; Hiroshi Maeda, all of Kanagawa, Japan

[73] Assignee: Fuji Photo Film Co., Ltd., Minami-Ashigawa, Japan

[21] Appl. No.: 266,846

[22] Filed: Nov. 3, 1988

[30] Foreign Application Priority Data

Nov. 6, 1987 [JP] Japan .................................. 62-279355

[51] Int. Cl.⁴ ............................................. B65D 85/38
[52] U.S. Cl. .................................. 206/397; 206/408; 206/416
[58] Field of Search ............... 206/416, 316, 400, 414, 206/408

[56] References Cited

U.S. PATENT DOCUMENTS 4,002,238  1/1977  Cameron et al. ................. 206/416
4,671,409  6/1987  Espy ................................. 206/416
4,733,777  3/1988  Van Geyte et al. .............. 206/416

*Primary Examiner*—Joseph Man-Fu Moy
*Attorney, Agent, or Firm*—Burns, Doane, Swecker & Mathis

[57] ABSTRACT

In a light-tight cassette for a roll of light-sensitive strip material comprising a body having a slot for extending the light-sensitive strip material and end panels closing both end openings of the body and supporting said roll, the improvement which comprises at least one of the end panels having a rotary core to which the core of the roll is fixed, a bearing means which rotatably supports the rotary core and a fixing means to fix the rotary core to the end panel releasably.

In the light-tight cassette of the invention, since the core of the light-sensitive strip material is fixed to an end panel through the rotary core by the fixing means, loosening of the roll of the light-sensitive strip material does not occur by the shaking during transportation or the like. Therefore, the problems in quality such as the degradation of surface quality do not occur. Since the fixation is readily released by pulling the light-sensitive strip material, it may easily be extended at the time of use.

2 Claims, 2 Drawing Sheets

LIGHT-TIGHT CASSETTE

BACKGROUND OF THE INVENTION

1. Field of the Invention

This invention relates to a light-tight cassette for a roll of light-sensitive strip material, such as photographic paper or photographic film, and more particularly, this invention relates to the light-tight cassette having a means of preventing loosening of the roll by the shaking during transportation.

2. Description of the Prior Art

A roll of light-sensitive strip material is usually placed in a lightproof container attachable to a printer of, such as, a photocomposer in a light room without exposing the roll to light. The loading of the light-sensitive strip material is carried out by attaching the container to the printer and extending the light-sensitive strip material from the slot of the container to a prescribed position of the printer.

A conventional light-tight cassette is, as shown in FIG. 4, composed of a square tube-shaped body 18 and a pain of end panels 19 attached to both open ends of the body 18. The light-sensitive strip material 16 is coiled around a core 15, and both ends of the core 15 are rotatably supported by inserting a receiving recess 20 provided in the center of each end panel 19. The light-sensitive strip material 16 is extended from the slot 21 provided near one edge of the body 18 in the direction paralled to the axial direction. However, since the roll of the light-sensitive strip material was placed in the cassette in a rotatable state, loosening of the roll occurred by shaking or the like during transportation. As a result, the extending resistance of the light-sensitive strip material from the slot increased, and it caused the slip in the printer or the like. Moreover, the extending resistance became too great, the light-sensitive strip material could not be extended.

On the other hand, another container capable of preventing the loosening is disclosed in Japanese Patent KOKAI No. 60-156058. In this container, the core is fixed to an end panel by inserting a key into the space of the core through an opening bored in the end panel. However, in the case of this container, a light-shielding means was necessary to be added in order to shield light leaked through the opening. Besides, the key was necessary to be inseted at the assembly and pulled out at the use, and these works were troublesome.

SUMMARY OF THE INVENTION

An object of the invention is to provide a light-tight cassette capable of preventing loosening of a roll of light-sensitive strip material by the shaking during transportation, capable of assembling and attaching readily and capable of loading readily in a printer or the like in a light room.

The present invention has been made in order to achieve the above object, and characterized by fixing temporarily the core to an end panel through a rotary core.

Thus, the light-tight cassette for a roll of light-sensitive strip material of the invention comprises a body having a slot for extending the light-sensitive strip material and end panels closing both end openings of the body and supporting the above roll, and is characterized by comprising at least one of the end panels having a rotary core to which the core of the roll is fixed, a bearing means which rotatably supports the rotary core and a fixing means to fix the rotary core to the end panel releasably.

DETAILED DESCRIPTION OF THE INVENTION

Figure 1:
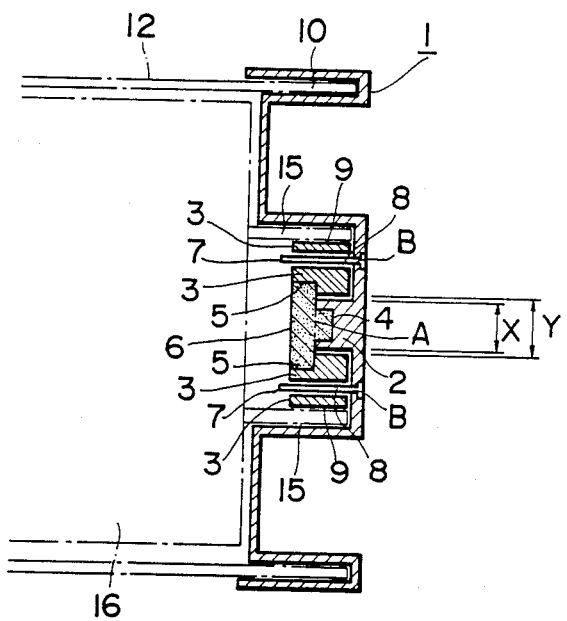
FIG. 1 is a horizontal sectional view of an end panel portion of a cassette embodying the invention.

The rotary core is fixed with the core of the light-sensitive strip material, and fixed to the end panel so as not to rotate prior to the use. While, the fixation is released at the time of the use, and the core of the light-sensitive strip material is made rotatable. It is sufficient that the rotary core integrally rotates with the core of the light-sensitive strip material, and the binding means of both members is not limited. For example, in the case the core of the light-sensitive strip material is cylindrical, the binding means may be mere fitting by the insertion with pressure.

The bearing means rotatably supports the rotary core, and various support means may be employed. The support position may be the inside or the outside of the rotary core.

The fixing means fixes the rotary core to the end panel releasably. It may be any means capable of releasing the fixation by pulling the light-sensitive strip material, and for example, the rotary core may be fixed by using a resin. The resin may be a curing type adhesive, such as thermosetting adhesives, thermoplastic adhesives and hot-melt adhesives. Among them, hot-melt adhesives are preferred. On the other hand, the rotary core may be fixed by inserting a pin into the end panel and the rotary core, or various other fixing means may be employed. The initial resistance at the time of pulling the light-sensitive strip material out may be controlled by the shearing area in the case of using a resin and by the total cutting area in the case of using a pin.

The body may be any known shape and made of any known material. However, since the cassette of the invention is usually throwaway, it is preferably a low cost. Therefore, the structure is preferably simple, and the production is preferably easy. The slot for extending the light-sensitive strip material is also not restricted in the shape, the structure and the like, to secure light-proofness and a suitable pulling resistance is sufficient.

The light-sensitive strip material includes various known materials, such as color photographic printing papers, photoresists, microfilms for computer, printing papers for computerized type-setting system, JIS 135-type photographic films and the like.

The light-tight cassette to which the present invention is applicable includes all containers having the structure so that a roll of a light-sensitive strip material coiled around a core is placed therein and it is extended through a slot. Examples of such containers are the light-shielding containers for microfilms for computer, the light-shielding containers for printing papers for computerized type-setting system, the light-shielding containers for color photographic printing papers and the cartridges for JIS 135-type photographic films.

In the light-tight cassette of the invention, since the core of the light-sensitive strip material is fixed to an end panel through the rotary core by the fixing means, loosening of the roll of the light-sensitive strip material does not occur by the shaking during transportation or the like. Therefore, the problems in quality such as the degradation of surface quality do not occur. Since the fixation is readily released by pulling the light-sensitive strip material, it may easily be extended at the time of use.

EXAMPLES

Figure 2:
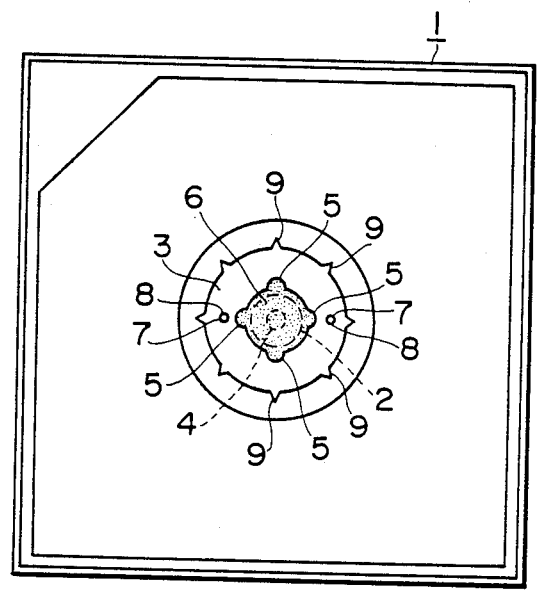
FIG. 2 is a side view of the same end panel portion seen from the inside of the cassette.
Figure 3:
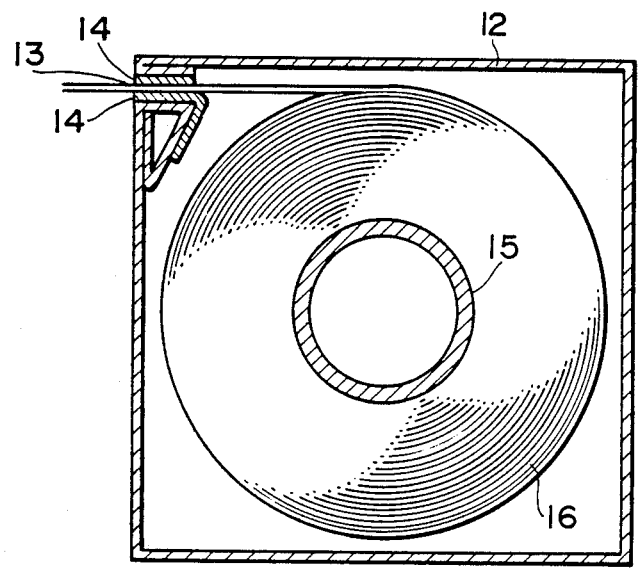
FIG. 3 is a longitudinal sectional view of the body portion of the same cassette.

An example of the light-tight cassette of the invention is illustrated in FIGS. 1 to 3.

As shown in FIGS. 1 and 2, the portion receiving the end of the core 15 of a light-sensitive strip material 16 is projected in a cylindrical shape from the center of an end panel 1 toward the outside of the cassette. A short rod-shaped bearing 2 is projected from the center of the portion receiving the core toward the inside of the cassette. The diameter (X) of the bearing 2 is 8.00 mm. A cylindrical recess 4 for filling a resin is formed on the top of the bearing 2. A ring-shaped rotary core 3 is fitted to the bearing 2. The inside diameter (Y) of the rotary core 3 is 8.10 mm. The clearance between the bearing 2 and the rotary core 3 is preferably made in the range of 0 to 0.2 mm so that the melted resin does not enter into the clearance. Four positions of the light-sensitive strip material side portion of the inner surface of the rotary core 3 are cut in the axial direction up to the top face position of the bearing 2 to from four channels 5. The channels 5 hold the cured resin filled therein, and force to shear the neck portion of the cured resin 6 at the first time of pulling the light-sensitive strip material 16. In the above embodiment, the shearing area A is consistent with the top face of the bearing 2 including the recess 4 position. A hot-melt adhesive 6 is filled and cured in the hole formed by the inner peripheral wall of the rotary core 3 and the top face of the bearing 2, and it fixes the rotary core 3 to the bearing 2.

In addition to or instead of the above fixing means using the hot-melt adhesive 6, another fixing means using pins may be incorporated into the cassette. In FIGS. 1 and 2, a pair of pin holes 7 is bored from the end panel 1 penetrating through the rotary core 3. A pin 8 is inserted into each pin hole 7 to fix the rotary core to the end panel 1. The total cutting area B is the sum of the cross section of two pins 8.

Angle-shaped projections 9 are formed on the outer surface of the rotary core 3 in the axial direction in order to fix the core 15 of the light-sensitive strip material 16.

A channel 10 for inserting the body 12 is formed along the outside edge of the end panel 1.

The end panel 1, the rotary core 3 and the pins 8 are made of plastic, for example GP polystyrene, HI polystyrene, ABS resin, polypropylene, polyacetal. The pins 8 may be integrally molded with the end panel 1. Also the rotary core 3 may be molded.

In FIG. 3, the body 12 is a square tube shape, and it is made of a corrugated board. The slot 13 for extending the light-sensitive strip material 16 is formed near one edge of the body 12 in the direction parallel to the axial direction, and teremp cloths 14 for shielding light is attached to the counter faces forming the slot 13.

When the roll of the light-sensitive strip material is placed in the cassette, one end of the paper core 15 of the light-sensitive strip material is inserted with pressure into the space between the rotary core 2 and the wall of the end panel 1. Since the half diameter from the center to the tip of the projection 9 is 13.1 mm which is longer than the half inside diameter of the paper core 15 being 13.0 mm, the paper core 15 is fixed to the end panel 1 through the rotary core 3. The leading end of the light-sensitive strip material 16 is extended, and the body 12 is attached to the end panel 1 so that the leading end is put out of the slot 13. Then, another end panel is fitted to the body 12 to complete the cassette. When the cassette is loaded in a printer, the leading end of the light-sensitive strip material is pulled until the cured hot-melt adhesive 6 is sheared (or the pin 8 is cut). Thereby, the roll of the light-sensitive strip material 16 is made freely rotatable. The cassette of which the fixation is released may be treated according to respective conventional manners.

The initial resistance to shear the hot-melt adhesive was about 2 kg, and the pulling resistance thereafter was 500 to 700 g.

Figure 4:
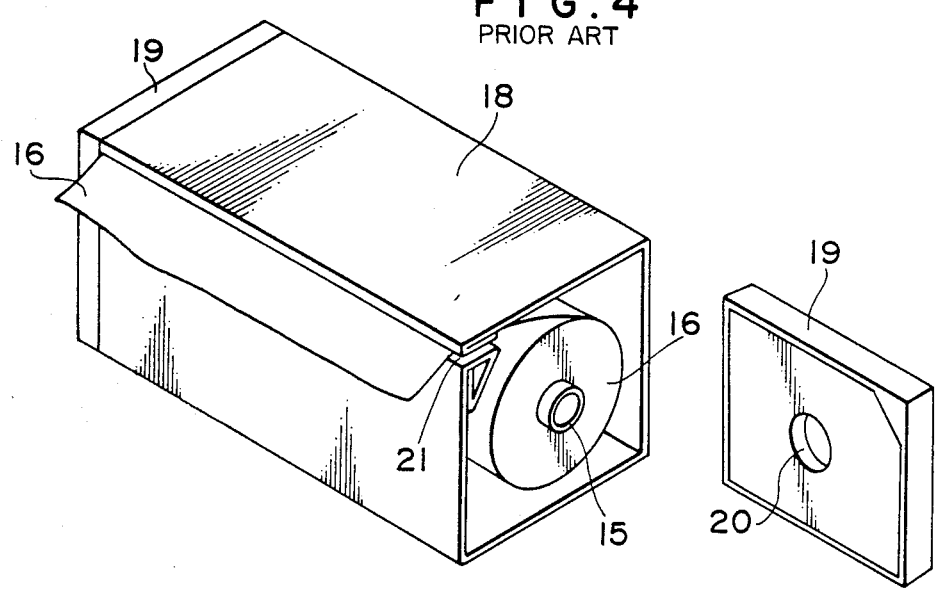
FIG. 4 is a partially exploded perspective view of a conventional cassette.

A shaking test was conducted as to the above cassette of the invention using the hot-melt adhesive 6 but not proving the pin mechanism and as to the conventional cassette shown in FIG. 4. As a result, in the case of the conventional cassette, the roll of the light-sensitive strip material is entirely loosened and it is difficult to be extended. Scratches and abrasion marks occurred in the light-sensitive strip material. Whereas, in the case of the cassette of the invention, the loosening of the roll was not loosened, and scratches nor abrasion marks did not occur at all.

We claim:

1. In a light-tight cassette for a roll of light-sensitive strip material comprising a body having a slot for extending the light-sensitive strip material and end panels closing both end openings of the body and supporting said roll, the improvement which comprises at least one of the end panels having a rotary core to which the core of the roll is fixed, a bearing means which rotatably supports the rotary core and a curing type hot-melt adhesive to releasably fix the rotary core to the end panel.

2. In a light-tight cassette for a roll of light sensitive strip material comprising a body having a slot for extending the light-sensitive strip material and end panels closing both end openings of the body and supporting said roll, the improvement comprising at least one of the end panels having a rotary core to which the core of the roll is fixed, a bearing means which is rotatably supports the rotary core and at least one pin inserted from the end panel into the rotary core to releasably fix the rotary core to the end panel.

* * * * *